United States Patent [19]
Abdelmonem et al.

[11] Patent Number: 5,848,073
[45] Date of Patent: Dec. 8, 1998

[54] METHOD AND APPARATUS FOR PREDICTING TRANSMISSION SYSTEM ERRORS AND FAILURES

[75] Inventors: Ahmed Hashem Abdelmonem, Convent Station, N.J.; Robert John Tasman Morris, Los Gatos, Calif.

[73] Assignee: Lucent Technologies Inc., Murray Hill, N.J.

[21] Appl. No.: 263,903

[22] Filed: Jun. 20, 1994

Related U.S. Application Data

[63] Continuation of Ser. No. 810,072, Dec. 19, 1991, abandoned.

[51] Int. Cl.$^6$ .................................................. G06F 11/00
[52] U.S. Cl. .................................................................. 371/5.1
[58] Field of Search .................................. 371/4, 5.1

[56] References Cited

U.S. PATENT DOCUMENTS

| | | | |
|---|---|---|---|
| 4,283,635 | 8/1981 | Balmer | 307/35 |
| 4,769,761 | 9/1988 | Downes et al. | 371/4 |
| 4,951,282 | 8/1990 | Mester | 371/5.1 |
| 4,974,180 | 11/1990 | Patton et al. | 371/5.1 |
| 5,023,872 | 6/1991 | Annamalai | 371/5.1 |
| 5,036,514 | 7/1991 | Downes et al. | 371/5.1 |
| 5,046,020 | 9/1991 | Filkin | 364/513 |
| 5,062,055 | 10/1991 | Chinnaswamy et al. | 364/513 |
| 5,113,483 | 5/1992 | Keeler et al. | 395/23 |
| 5,150,368 | 9/1992 | Autruong et al. | 371/31 |
| 5,214,687 | 5/1993 | Kansalcoski et al. | 371/5.1 |
| 5,223,827 | 6/1993 | Bell et al. | 371/5.1 |

OTHER PUBLICATIONS

T. Studt, "Neural Networks: Computer Toolbox for the '90s," *R&D Magazine,* Sep. 1991, pp. 36–42. Applications.
D. Bailey and D. Thompson, "Developing Neural–Network," *AI Expert,* Sep. 1990, pp. 34–41.
D. Bailey and D. Thompson, "How to Develop Neural–Network," *AI Expert,* Jun. 1990, pp. 38–47.
A. Hiramatsu, "ATM Communications Network Control by Neural Network," International Conference on Neural Networks, Washington, DC, Jun. 1989, pp. I–259–266.

*Primary Examiner*—Joseph Palys
*Attorney, Agent, or Firm*—S. R. Williamson

[57] ABSTRACT

Errors or failures in a transmission system (10) can be accurately predicted by a system (18) which processes error or failure data collected by the transmission system during uniform intervals to yield data indicative of the errors or failures during each of a plurality of non-uniform, overlapping intervals. The errors or failures measured during the non-uniform intervals are selectively weighted and summed within a neural network (22), trained with historical error or failure data, to yield a set of predictions, each representing the predicted number of errors or failures during each non-uniform interval. The predictions from the neural network (22) are then thresholded by a control unit (24) and used to raise an alarm which signals the possibility of error or failure in the transmission system.

7 Claims, 1 Drawing Sheet

METHOD AND APPARATUS FOR PREDICTING TRANSMISSION SYSTEM ERRORS AND FAILURES

This application is a continuation of Ser. No. 07/810,072 filed Dec. 19, 1991, now abandoned.

TECHNICAL FIELD

This invention relates to a method and apparatus for accurately predicting the occurrence of errors and failures in a transmission system which transmits information across a communications channel.

BACKGROUND OF THE INVENTION

There presently exist different types of transmission systems for carrying voice and/or data (information) across a communications channel. In the past, analog systems have been used to transmit analog information across a copper cable or across a radio channel. More recently, digital systems have been developed for transmitting information in digital form, either across a radio channel or an optical fiber cable. Regardless of the type of system employed, service disruptions can and do occur, although present day digital transmission systems generally have a greater reliability than analog systems. Service disruptions are very undesirable, as they often result in lost revenues to the transmission system owner and invariably cause dissatisfaction among system users. Predicting when a disruption is likely to occur would be desirable since such an advance knowledge would allow steps to be taken to avoid, or at least ameliorate, the consequences of an impending disruption.

Unfortunately, predicting transmission system errors and/or failures likely to occur in the future is an extremely difficult task. Monitoring the transmission system to detect errors and/or failures generates large amounts of data that must be analyzed. Even when all of such data is analyzed, the likelihood of predicting errors and/or failures in the future is still small, as future errors and failures tend to be random and non-stationary events. While some failures, such as a cable cut, are impossible to predict, other types of failures or error conditions may be preceded by a gradual deterioration of performance which can be observed by monitoring error rates. In the past, "expert systems," that is, systems which rely on a fixed set of rules, have been employed to analyze data of transmission system errors in an attempt to predict failures and/or errors. Such expert systems operate on the premise that each type of problem circuit within a transmission system will generate errors and/or failures which manifest themselves in a particular pattern whose identity can be ascertained by one or more rules. The disadvantage of using an expert system is that rules must be established for every potential type of error and/or failure. Often, expert systems work with simple rules that compare a particular error or failure measure against a threshold value. However, such simple procedures are not sufficiently powerful to detect trends in performance and correlation between multiple error or failure measures, and they lack the flexibility of adapting to environmental and other changes in system performance.

Thus, there is a need for a technique for accurately and efficiently predicting errors and/or failures in a transmission system.

SUMMARY OF THE INVENTION

Briefly, in accordance with a preferred embodiment of the invention, a technique is disclosed for predicting errors or failures (i.e., "non-performance") in a transmission system. The technique is practiced by first establishing a set of non-uniform measuring intervals which are appropriate to detect several types of nonperformance. Once the non-uniform intervals are established, the number of instances of non-performance occurring during each non-uniform interval is determined from the errors or failures received periodically from the transmission system. Thereafter, the number of instances of non-performance established for each of the non-uniform intervals is input to a neural network which selectively weighs the non-performance numbers, based on past non-performance data, and sums the weighted numbers to yield a set of output values. The weightings are established by past non-performance data of the transmission system such that each output value generated by the neural network represents the predicted number of instances of non-performance that are expected to occur during the next occurrence of a corresponding one of the non-uniform intervals. The output values (predictions) of the neural network are then compared to a threshold to see whether an alarm condition signaling a possible impending error or failure should be raised.

The neural network of the invention, which is trained using historical data, has been found to yield more accurate results than prior art rule-based systems. Moreover, it affords the flexibility to adapt to changing conditions by retraining from current data, but without any change to its structure.

DETAILED DESCRIPTION

Figure 1:
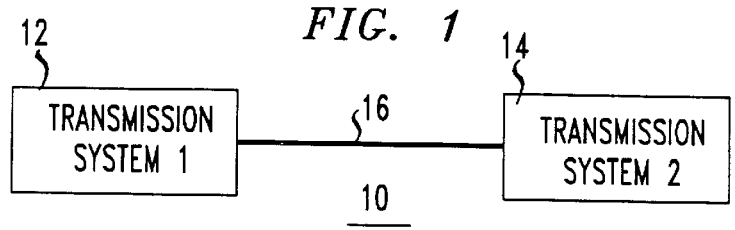
FIG. 1 is a block schematic diagram of a transmission system in accordance with the prior art.

FIG. 1 is a block diagram of a prior-art transmission system 10 comprised of first and a second transceivers 12 and 14 capable of sending information simultaneously to each other across a communications channel 16. The first transceiver 12 may take the form of any well-known system for sending and receiving information, either voice or data or both, such as a carrier system or a radio system. The second transceiver 14 will typically be configured the same as the transceiver 12. The communications channel 16 may take the form of either a radio channel, a copper cable or an optical fiber cable. In the illustrated embodiment, the transmission system 10 transmits information across the communications channel 16 at a rate of 1.544 million bits per second (Mbps), although it should be understood that the rate could be higher or lower.

Notwithstanding the care given to their respective design and manufacture, sometimes one or both of the transceivers 12 and 14 may become partially or completely disabled, giving rise to errors in the information transmitted across the channel 16, or worse, a complete absence of any information at all. Such problems could also occur as a result of disturbance to the channel 16 caused by, for example, weather conditions. A common measure of the failures in transmission system 10 is the number of "failed seconds," that is, the number of seconds within a periodic interval during which no information was transmitted across the communications channel 16. A measure of the errors is the number of "error seconds," that is, the number of seconds with a periodic interval during which the information transmitted contained one or more errors. While erroneous information is usually better than no information at all, even a small number of error seconds is usually intolerable.

The increasing dependence by everyone today on the information carried by transmission systems, such as the system 10, makes it extremely important that errors and disruptions be minimized. From the standpoint of those responsible for maintaining the transmission system 10, the ability to predict transmission system failures and/or errors would be extremely useful. If the future occurrence of periods of failed seconds and/or error seconds could be accurately predicted, then steps could be taken to ameliorate, if not completely eliminate, their occurrence.

Figure 2:
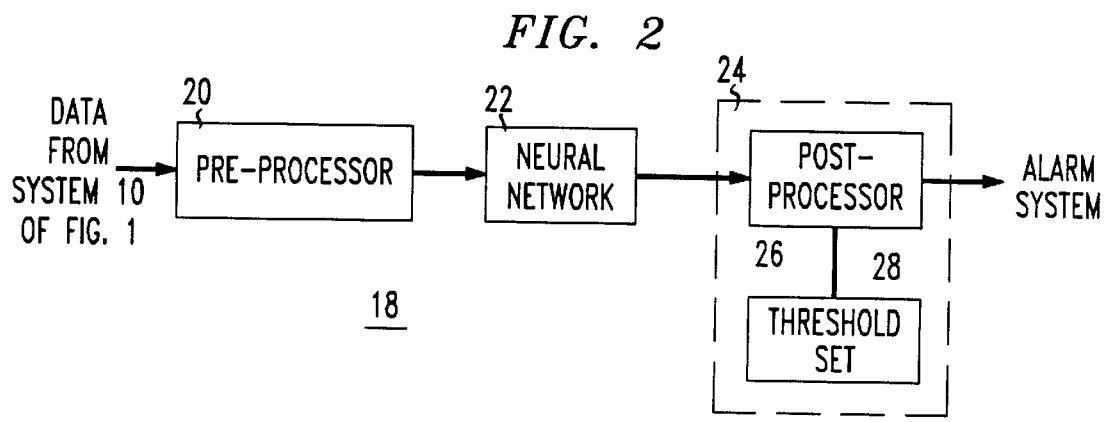
FIG. 2 is a block schematic diagram of a system, in accordance with the invention, for predicting failures in the transmission of information transmitted by the system of FIG. 1.

Referring to FIG. 2, there is shown a block diagram of a system 18, in accordance with the invention, for predicting errors or failures in the transmission system 10 of FIG. 1. The system 18 is comprised of a pre-processor 20, a neural network 22, and a control unit 24 which includes a post-processor 28 and a threshold set 30.

The pre-processor 20 processes incoming error or failure data, received at uniform, periodic intervals from the system 10, to obtain a set of error or failure measurements reflecting the errors occurring during a separate one of a plurality of non-uniform intervals. In practice, the transmission system 10 of FIG. 1 samples the information carried by the communications channel 16 of FIG. 1 and measures the number of errors or failed seconds occurring during successive uniform intervals. Typically, although not necessarily, each such interval is 15 minutes in length. Intervals of shorter or longer length are possible.

In order to eliminate as much as possible noise effects (which are defined as errors that do not signal impending failures) while retaining important trends (which may signal impending failures), we have found it useful to use a moving-average window to average the results of multiple intervals. Thus, if the failure counts of a particular type (e.g., failed seconds) are denoted by the time series $F_1, F_2, \ldots$, with each observation corresponding, for example, to a 15-minute interval, then we define:

$$FS\_n_t = \frac{1}{n} \sum_{i=t}^{t-n+1} F_i \quad (1)$$

to be the moving average of length n at a particular time t. We will use the notation ES_n to denote $FS\_n_t$ where t is assumed to be the present, or current, time. Thus FS_4 denotes the moving-average interval for the last hour. We will use, for example, $FS\_1, FS\_4$, FS_16 and FS_96 as inputs to the neural network 22. The choice of number and length of these intervals can be based on a variety of methods, including an obvious trial and error method, or a method based on knowledge of the time constants for various failure modes of the system. Accordingly, at the end of each overlapping 15-minute, 60-minute, 4-hour and 24-hour interval, the pre-processor 20 collects the failures occurring during each such past interval from information supplied by the transmission system 10 at 15-minute intervals. The pre-processor outputs a separate one of a set of values FS_1, FS_4, FS_16 and FS_96, respectively, indicative of an averaged number of failed seconds for each corresponding 15-minute, 60-minute, 4-hour and 24-hour interval.

Figure 3:
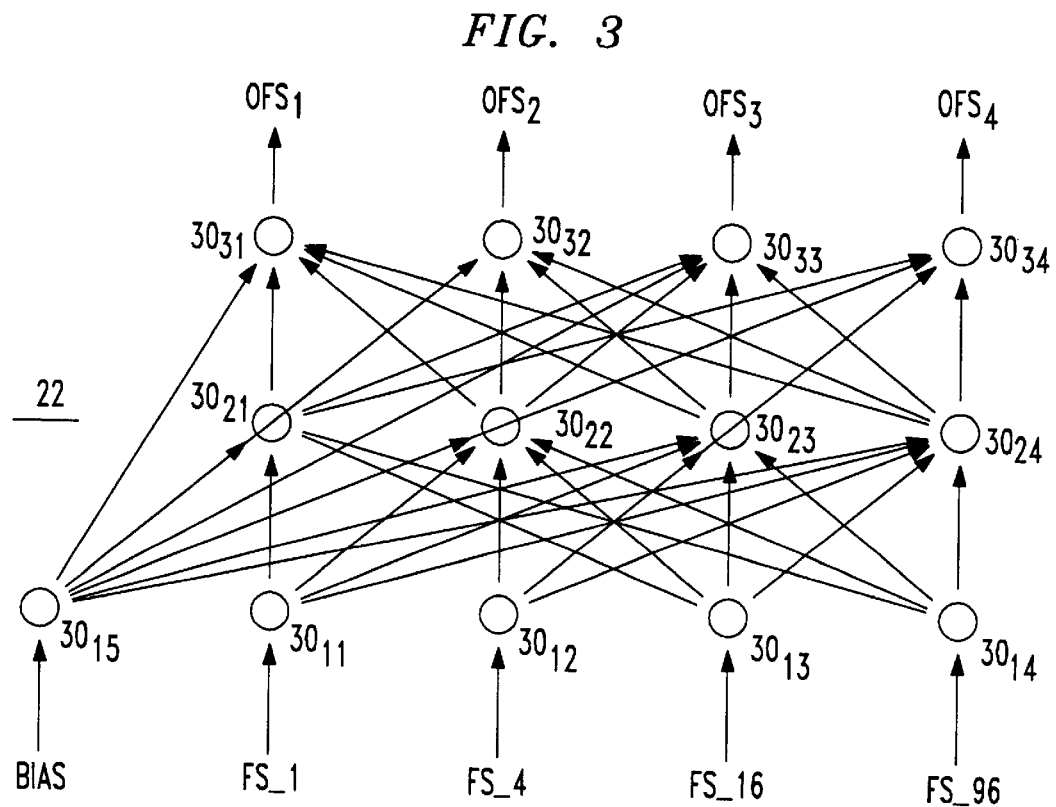
FIG. 3 is a block diagram of a neural network comprising a portion of the system of FIG. 2.

The values FS_1, FS_4, FS_16 and FS_96 output by the pre-processor 20 are received by the neural network 22 whose details are best illustrated in FIG. 3. This neural network is a typical three-layer neural network as described in D. E. Rumelhart and J. L. McClelland, Parallel Distributed Processing: Vol. 1, Cambridge, Mass., MIT Press, 1986. As seen in FIG. 3, the neural network 22 is comprised of a matrix of neurons $30_{11}-30_{3034}$, and a bias neuron $30_{15}$. Each of the neurons $30_{11}-30_{34}$ and $30_{15}$ functions as a unidirectional signal channel for producing a weighted output signal as a function of the signals input thereto. In this way, each of the neurons $30_{11}-30_{34}$ and $30_{15}$ emulates a real (biological) neuron. In the preferred embodiment, the neurons $30_{11}-30_{34}$ and $30_{15}$ each operate to perform a weighted sum and sigmoid transfer function on the incoming data. The sigmoid transfer function is a well-known, bounded, monotonic function which provides a non-linear response, as described in Rummelhart and McClelland and exemplified by the function $F(x)=(1+e^{-x})^{-1}$.

The neurons $30_{10}-30_{34}$ are arranged in three separate rows or layers comprised of neurons $30_{11}-30_{14}$, $30_{21}-30_{24}$ and $30_{31}-30_{34}$. The first layer of neurons $30_{11}-30_{14}$, is referred to as the input layer because a separate one of the error values FS_1, FS_4, FS_16 and FS_96 output by the pre-processor 20 is input to a corresponding one of the neurons in this layer. The second layer of neurons $30_{21}-30_{24}$ is referred to as the "hidden" layer, as the neurons $30_{21}-30_{24}$ do not receive external input signals nor do they generate signals which are output externally from the network 22. Rather, each of the neurons $30_{21}-30_{24}$ is separately supplied with the signals of all of the neurons $30_{11}-30_{14}$ in the input layer, as well as a signal from the bias neuron $30_{15}$ which derives its name because it is supplied with a constant level bias signal. Each of the neurons $30_{21}-30_{24}$ in the hidden (second) layer supplies a weighted output signal to a separate one of the neurons $30_{31}-30_{34}$ in the third layer, which also each receive a signal from the bias neuron $30_{15}$.

The third layer of neurons $30_{31}-30_{34}$ is referred to as the output layer, 30 as the output signal of the neurons in this layer, represented by a corresponding one of the terms $OFS_1$, $OFS_2$, $OFS_3$ and $OFS_4$, respectively, represents a separate one of the outputs of the neural network. The neural network 22 output signals $OFS_1$, $OFS_2$, $OFS_3$ and $OFS_4$ represent the value of the number of failed seconds that are predicted to occur during the next overlapping 15-minute, 1-hour, 4-hour and 24-hour future intervals, respectively. Each of these future intervals starts at the present and extends into the future by its prescribed length.

To better understand the flow of information within the neural network 22, it should be appreciated that each of the neurons $30_{21}-30_{24}$ in the hidden layer receives the weighted signal from each of the neurons $30_{11}-30_{15}$. Mathematically, the value $h_j$ of the signals "seen" (i.e., received) by each of the neurons $30_{21}-30_{24}$ can be represented by the relationship:

$$h_j = \sum_{i=1}^{i=4} w_{ji}x_i + w_{j0} \quad (2)$$

where $w_{ji}$ represents the weight of the signal received from $x_i$, representing a separate one of the neurons $30_{11}-30_{14}$ in the input layer, and $w_{j0}$, the signal received from the bias neuron $30_{15}$. Each of the neurons $30_{21}-30_{24}$ produces a signal $H_j$ (where j=1,2,3,4) given by the relationship:

$$H_j = F(h_j) = F\left(\sum_{i=1}^{i=4} w_{ji}x_i + w_{j0}\right) \quad (3)$$

where F represents the sigmoid function as described earlier.

By the same token, each of the neurons $30_{31}-30_{34}$ in the output (third) layer receives the weighted signal from each of the neurons $30_{21}$–$30_{24}$ in the hidden layer and from the bias neuron $30_{15}$. Mathematically, the relationship of the signals $o_k$ (k=1,2,3,4) "seen" by each of the neurons $30_{31}$–$30_{34}$ is given by the relationship:

$$o_k = \sum_{j=1}^{j=4} w'_{kj} x_j + w'_{k0} \quad (4)$$

where $w'_{kj}$ represents the weight of a signal from the neurons $30_{21}$–$30_{24}$ in the hidden layer and $x_j$ represents the value of $H_j$ of equation (3).

The output values $OFS_1$, $OFS_2$, $OFS_3$ and $OFS_4$ produced by the neurons $30_{31}$–$30_{34}$ in the output layer can be given mathematically by the relationship:

$$OFS_k = F(o_k) = F\left( \sum_{j=1}^{j=4} w'_{kj} H_j + w'_{k0} \right) \quad (5)$$

By combining equations (3) and (5), each output value (prediction) $OFS_k$ (k=1,2,3,4) can be given mathematically by the relationship:

$$OFS_k = F\left( \sum_{j=1}^{j=4} w'_{kj} F\left( \sum_{i=1}^{i=4} w_{ji} x_i + w_{j0} \right) + w'_{k0} \right) = F(x, \beta) \quad (6)$$

where $\beta$ represents a vector of all of the weights $w_{ji}$, $w_{j0}$, $w'_{kj}$, and $w'_{k0}$, and x represents a vector of the failure input values FS_1, FS_4, FS_16 and FS_96, respectively.

The vector $\beta$ is established by using a standard back-propagation learning algorithm, as discussed in Rumelhart and McClelland. It should be noted that the $OFS_k$ values are bounded by the range of the sigmoid function F, typically between 0 and 1. The training set $F_1$, $F_2$, ... is prenormalized for training by dividing each value $F_i$ by the largest observed value of any $F_i$, i=1, .... This largest value is then used as a postnormalizing constant described below. In practice, historical failure data from the transmission system 10 of FIG. 1, as processed by the pre-processor 20 of FIG. 2, is input to the neural network 22 which in turn yields the output values $OFS_1$, $OFS_2$, $OFS_3$, $OFS_4$. The output values are compared to actual failure values for the data, and the weights of the weight vector $\beta$ are adjusted. This process is repeated until the neural network 22 has learned the training pattern to within a predetermined tolerance. In other words, the process is continuously repeated until the output values $OFS_1$, $OFS_2$, $OFS_3$, $OFS_4$ predict, with minimal mean square error, the actual number of failed seconds that will occur within the next 15-minute, 1-hour, 4-hour and 24-hour intervals, respectively.

In the illustrated embodiment, the historical data used for training comprised about 1000 samples obtained from the transmission system 10 of FIG. 1 and processed by the pre-processor 20. A computer program Neural Works, by Neural Ware Inc., was run on a personal computer to establish the weights of the vector 3. It should be understood that the weights depend on the sample data and different sample data would produce different weights.

The output values $OFS_1$, $OFS_2$, $OFS_3$ and $OFS_4$ are normalized predictions of the transmission system 10. The output of the neural network 22 is input to the control unit 24 of FIG. 2, which postnormalizes each of these estimates by multiplying by the maximum value observed during the training process described above. This postnormalized value is then compared against a corresponding threshold value which can be interpreted as the nominal maximum acceptable error, or failure figure, for the system over the corresponding interval. If the postnormalized value exceeds the threshold value, then an alarm signal is sent to the alarm system.

Typically, the threshold values for the post-processor 26 are selected in accordance with an assessment of what is a tolerable performance specification of the circuits (not shown) within the transmission system 10 and an assessment of what threshold values will maximize the number of correct predictions while minimizing those which are incorrect. While the threshold values for the post-processor 26 are typically set once, after training the post-processor 26 with known error values, the threshold values could easily be updated continuously, to achieve an adaptive and dynamic thresholding. For example, one can adjust the threshold value so as to achieve a certain failure detection probability, while not exceeding a certain probability of a false alarm.

In a preferred embodiment, the functions performed by the pre-processor 20, the neural network 22 and the control unit 24 (comprised of the post-processor 26 and threshold set 28) are each performed by a single computer, typically an AT&T model 6386 computer. Alternatively, the functions performed by the pre-processor 20, the neural network 22 and the control unit 26 could each be performed by separate computers.

The foregoing discloses a technique which relies on the use of a neural network 22 to accurately predict failures (i.e., the number of failed seconds occurring during overlapping intervals in a transmission system 10. Note that rather than predict the number of failed seconds, the system 18 could also predict the number of error seconds, provided that such information was initially input to the pre-processor 20.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for predicting errors or failures (i.e., "non-performances") in a system for transmitting information across a communications channel in accordance with non-performances measured during periodic intervals, comprising the steps of:

determining the number of non-performances occurring during each of a plurality of non-uniform length, non-performance measurement intervals by computing the average of the non-performances over multiple uniform intervals;

selectively weighting the non-performance number for each non-uniform interval;

summing the selectively weighted non-performance numbers for the non-uniform intervals and applying a sigmoid function to yield a set of intermediate values;

selectively weighting the intermediate values; summing the selectively weighted intermediate values and applying a sigmoid function to yield a set of predicted values and;

comparing the predicted values to threshold values and raising an alarm if any predicted value exceeds a corresponding threshold value.

2. The method according to claim 1 wherein the step of determining the number of non-performances during each non-uniform interval comprises the steps of:

computing a moving average of the non-performances occurring during periodic, equal-length intervals; and accumulating the non-performances determined in successive, equal-length intervals until the time elapsed corresponds to the non-uniform-length interval.

3. The method according to claim 1 wherein the selective weightings are established by the steps of:

determining the number of non-performances in each of the set of non-uniform, overlapping intervals for historical data obtained for the transmission system;

weighting the non-performance number for each non-uniform interval;

summing the weighted non-performance numbers for the non-uniform intervals to yield output values predicting the number of non-performances in each non-uniform interval; and re-executing the steps of: summing the weighted non-performance numbers, comparing the actual number of non-performances, and adjusting the nominal weightings until the predicted number of non-performances is within a predetermined tolerance of the actual non-performances.

4. Apparatus for predicting errors or failures (i.e., "non-performances") in a system for transmitting information across a communications channel based on non-performances measured during each of a plurality of uniform-length intervals, comprising:

a pre-processor for pre-processing the non-performances measured during uniform-length intervals to obtain a set of non-performance measurements reflecting the number of non-performances occurring during each of a plurality of non-uniform intervals;

a neural network for selectively weighting the number of non-performances measured during each of the non-uniform intervals and for summing the selectively weighted non-performance numbers to yield a set of output values, each representing a prediction of the number of non-performances likely to occur within a separate one of the non-uniform intervals; and means for comparing the output values produced by the neural network with preset values, and for raising an alarm if the predictions exceed the preset values.

5. The apparatus according to claim 4 wherein the neural network comprises a matrix of neurons arranged in three layers, the neurons in the first layer each receiving the non-performance number for a separate one of the non-uniform intervals and generating a weighted output signal in accordance therewith, the neurons in the second layer each receiving the weighted output signal of all of the neurons in the first layer and generating a weighted signal in accordance therewith, and the neurons in the third layer each receiving the weighted output signal of all of the neurons in the second layer and generating a separate one of the output values in accordance therewith.

6. The apparatus according to claim 4 wherein the means for adjusting the output values produced by the neural network comprises:

means for adjusting the output values of the neural network by separate threshold amounts; and means for comparing the predicted values with a set of thresholds and raising an alarm if the threshold is exceeded.

7. The apparatus according to claim 4 wherein the means for establishing the non-uniform intervals, the neural network and the means for adjusting the neural network output values collectively comprise a computer.

* * * * *